(12) United States Patent
Kim et al.

(10) Patent No.: US 8,897,726 B2
(45) Date of Patent: Nov. 25, 2014

(54) BLOCK SHARING USING THREE-WAY TRANSFORMERS IN WIRELESS CIRCUITS

(75) Inventors: Kwan-Woo Kim, Santa Clara, CA (US); Thinh Nguyen, Santa Clara, CA (US); Arvind Keerti, Santa Clara, CA (US); Sudhakar Kalakota, Santa Clara, CA (US); Rainer Gaethke, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/526,825

(22) Filed: Jun. 19, 2012

(65) Prior Publication Data
US 2013/0337755 A1 Dec. 19, 2013

(51) Int. Cl.
*H03C 1/62* (2006.01)
*H04B 17/00* (2006.01)

(52) U.S. Cl.
USPC .................. 455/115.1; 455/67.14; 455/425

(58) Field of Classification Search
USPC ............ 455/115.1, 425, 67.11, 67.14, 67.12
See application file for complete search history.

(56) References Cited

U.S. PATENT DOCUMENTS

| | | | |
|---|---|---|---|
| 6,996,379 B2 | 2/2006 | Khorram | |
| 7,711,070 B2 | 5/2010 | Weissman et al. | |
| 8,145,160 B2 | 3/2012 | Kim et al. | |
| 2009/0163157 A1 | 6/2009 | Zolfaghari | |
| 2010/0127780 A1 | 5/2010 | An et al. | |
| 2011/0171994 A1 | 7/2011 | Rajendran et al. | |
| 2011/0222443 A1* | 9/2011 | Khlat | 370/277 |
| 2011/0280147 A1* | 11/2011 | Tikka et al. | 370/252 |
| 2011/0291768 A1* | 12/2011 | Chen et al. | 333/25 |
| 2011/0299431 A1 | 12/2011 | Mikhemar et al. | |
| 2012/0099630 A1 | 4/2012 | Verhelst et al. | |

OTHER PUBLICATIONS

International Search Report and Written Opinion—PCT/US2013/045711—ISA/EPO—Sep. 25, 2013.

* cited by examiner

*Primary Examiner* — Christian Hannon
(74) *Attorney, Agent, or Firm* — Micheal S. Kramer (57) ABSTRACT

A multipath circuit is described that has multiple signal paths and various common components used for normal operation. Each of the multiple signal paths also has multiple circuit blocks defining the functionality of the signal path. A shared access path is provided through the third winding of a three-way transformer for each signal path. Multiple switches are provided in the multipath circuit that couple to the third winding in each of the multiple signal paths. The switches are also coupled to the various common components. Selected ones of these switches may be closed to provide a shared access path between a common component and one of the signal paths or between a common components and one of the circuit blocks in one of the signal paths.

21 Claims, 7 Drawing Sheets

BLOCK SHARING USING THREE-WAY TRANSFORMERS IN WIRELESS CIRCUITS

BACKGROUND

1. Field

Aspects of the present disclosure relate generally to wireless communication systems, and more particularly, to block sharing using three-way transformers in wireless circuits.

2. Background

In modern wireless radio design, a transmitter should support multiple frequency bands and standards in order to support new standards as well as maintaining backward compatibility. The desire to support such multiple frequencies and standards has lead to more components and signal paths being added to the wireless transmitter. While this modern wireless radio equipment and componentry has become much smaller with advances in circuit integration techniques and technology, the additional componentry and smaller footprint causes the amount of space on the chip die to become less available and more valuable.

For testing and calibration of the different sections and components of a radio transmitter, dedicated conductor traces and test pins have previously been designed and integrated into the transmitter chips. However, because of the increasing scarcity and expense of chip die area, it is no longer practical or cost effective to create dedicated conductor traces.

SUMMARY

Representative aspects of the present disclosure are directed to a wireless radio transmitter configured for wireless communication. The wireless radio transmitter includes multiple signal paths, each of which includes multiple circuit blocks, one or more common components coupled to each of the signal paths, a three-way transformer in each of the signal paths, wherein a first winding of the three-way transformer is coupled to a first group of the circuit blocks, a second winding of the three-way transformer is coupled to a second group of the circuit blocks, and a third winding of the three-way transformer is coupled to the one or more common components. The wireless radio transmitter also includes one or more third winding switches coupled to the third winding of the three-way transformer of each of the signal paths, wherein, in response to activation of the one or more third winding switches, a shared access path is created between the common components and at least one of the first and second groups of circuit blocks.

In an additional aspect of the disclosure, a method for testing a multipath circuit includes activating a testing path into a signal path of multiple signal paths of the multipath circuit, where the testing path is coupled to a third winding of a three-way transformer coupled into the signal path. The method further includes transmitting one or more deactivation signals via the testing path to either or both of one or more of the circuit blocks within the signal path and one or more of the common components coupled to each of the plurality of signal paths. The method also includes testing active ones of each of the circuit blocks and common components using the testing path.

In an additional aspect of the disclosure, a multipath wireless circuit, includes means for activating a testing path into a signal path of multiple signal paths of the multipath circuit, where the testing path is coupled to a third winding of a three-way transformer coupled into the signal path. The multipath wireless circuit also includes means for transmitting one or more deactivation signals via the testing path to either or both of one or more of the circuit blocks within the signal path and one or more of the common components coupled to each of the p signal paths. The multipath wireless circuit also includes means for testing active ones of each of the circuit blocks and common components using the testing path.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for wireless radio transmitters configured for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used in wireless radio transmitters configured for the wireless networks and radio access technologies mentioned above, as well as other wireless networks and radio access technologies.

As noted, modern wireless radio transmitters should be able to support multiple frequency bands and standards to support new as well as previous standards. However, the limits on increasing chip die area have given rise to techniques for sharing common circuit blocks and pins to provide more flexible support while conserving chip area. A configuration is described that provides a shared signal access path to a multipath circuit. The multipath circuit, such as a wireless transmitter, has multiple signal paths and various common components used for normal operation. Each of the multiple signal paths may also have multiple circuit blocks defining the functionality of the signal path. Multiple switches are provided in the multipath circuit that couple to a signal path access node in each of the multiple signal paths. The switches are also coupled to the various common components. Selected ones of these switches may be closed to provide a shared access point between a common component and one of the signal paths or between a common components and one of the circuit blocks in one of the signal paths.

For example, in a wireless transmitter, one of the common components may be a test pin. By activating certain of the switches and deactivating the mixer circuit block of the signal path, the power amplifier circuit block of one of the signal paths may be coupled to the test pin through the signal path access node. The signal path access node is configured using a three-way transformer, which includes a third winding on the transformer that may already exist in the signal path. Each segment within the signal path, including certain common components may be enabled or disabled in order to isolate certain parts of the signal path and corresponding circuit components to be tested. For example, by disabling the front end componentry and injecting a test signal through the signal path access node to drive the power amplifier, the power amplifier may be tested in isolation. Furthermore, by enabling the mixer block and disabling the power amplifier block, the transmitter baseband filter and mixer may be tested over the same signal path to the test pin without the non-linear effects of the power amplifier. Thus, the signal path may be shared for various portions of the multipath circuit.

It should be noted that in the various aspects of the present disclosure, deactivating or disabling selected circuit blocks, such as the mixers, local oscillators (LOs) power amplifiers, and the like, or selected common components, such as the filters, digital-to-analog converters (DACs), and the like, may be implemented through switches. Such disabling or deactivating switches may simply de-couple the component from the circuit or may disengage power to the particular component.

Figure 1:
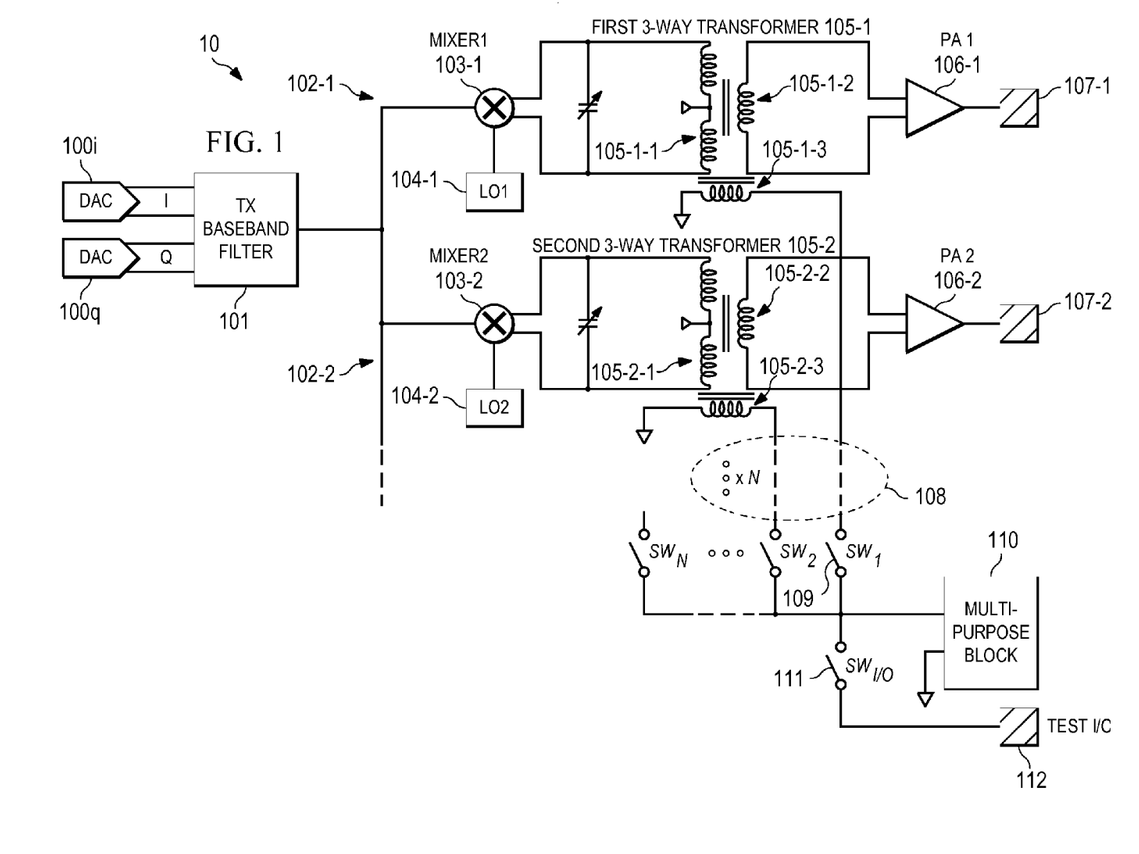
FIG. 1 is a circuit diagram conceptually illustrating wireless transmitter configured according to one aspect of the present disclosure.

FIG. 1 is a circuit diagram illustrating an example wireless transmitter 10 configured according to one aspect of the present disclosure. Wireless transmitter 10 includes DACs 100*i* and 100*q* each receiving phase shifted input signals in an in-phase and quadrature relationship. The in-phase (I) and quadrature (Q) signals may arrive from a quadrature demodulator that demodulates a single signal into the I and Q components. The digitized output from DACs 100*i* and 100*q* is filtered at transmitter baseband filter 101 and output to any one or number of signal paths. The wireless transmitter 10 illustrates two signal paths, signal paths 102-1 and 102-2, out of N possible signal paths. The filtered signals are processed in signal path 102-1 through mixer 103-1 driven by LO 104-1 and power amplifier 106-1. The processed and amplified signal is then provided at output pin 107-1, from which it may drive an antenna for transmission or be provided for further processing such as through modulators multiple input, multiple output (MIMO) processors, and the like. Similar signal processing is performed through signal path 102-2 with components, such as mixer 103-2, LO 104-2, and power amplifier 106-2, after which the output is provided to output pin 107-2.

As configured according to the example aspect, a three-way transformer, transformers 105-1 and 105-2, is placed into each of the signal paths of wireless transmitter 10, such as signal paths 102-1 and 102-2. The transformers 105-1 and 105-2 each have three windings, a first winding 105-1-1 and 105-2-1, a second winding, 105-1-2 and 105-2-2, and a third winding 105-1-3 and 105-2-3. A two-way transformer is often already present within the signal paths of wireless transmitters to provide inductive coupling of processed signals between circuit blocks of the signal paths. Such a two-way transformer provides less of a load on the signal path of the transmitters. Adding the third winding 105-1-3 and 105-2-3 with a tap coupled to a shared access path 108 provides an signal path access node at the third winding 105-1-3 and 105-2-3 without appreciably increasing the load on the transmitter circuit. Activating the third winding 105-1-3 of transformer 105-1 and closing switch (SW$_1$) 109 allows for signals to be received from the signal path 102-1 or signals injected into signal path 102-1. This access path defined by the third winding 105-1-3 of transformer 105-1, shared access path 108, and switch SW$_1$ 109 may allow reading or injecting signals through a single, shared access path 108, at test input/output (I/O) pin 112, depending on the state of switch SW$_{I/O}$ 111, or from one or more components generically identified by multi-purpose block 110, also depending on the state of switch SW$_{I/O}$ 111.

With this configuration, providing for the three-way transformers 105-1 and 105-2 as signal path access nodes, the wireless transmitter 10 may operate in multiple different modes to test performance or calibrate various components within wireless transmitter 10. Coupling various testing and calibration equipment to either test I/O pin 112 or as multi-purpose block 110, signals may be injected into selected signal paths to enable or disable various portions of the common components, such as DACs 100*i-q*, transmitter baseband filter 101, multi-purpose block 110, text I/O 112, and the like, and circuit blocks of wireless transmitter 10, such as mixers 103-1 and 103-2, LOs 104-1 and 104-2, power amplifiers 106-1 and 106-2, and the like, using enablement switches (not shown) located within such common components and circuit blocks. For example, testing equipment coupled to test I/O pin 112 can signal to disable LO 104-1 and power amplifier 106-1. Thereafter, the testing equipment may measure the filtering characteristics of transmitter baseband filter 101 by measuring the output of transmitter baseband filter 101 from test signals applied at DACs 100*i* and 100*q*.

It should be noted that various combinations of disabling/enabling of circuit components may be used to test individual points in the selected signal pathways of wireless transmitter 10 using shared access paths, shared access paths 108. Moreover, by selectively closing switches SW$_1$, SW$_2$, to SW$_N$— 109 any single one of the signal paths of wireless transmitter 10 may be tested or any combination of components or parts of the selected signal paths using a single, shared test path. Thus, various aspects of the present disclosure may define multiple different modes of operation for the wireless transmitter 10 corresponding to the circuit block or component desired for testing.

Figure 2:
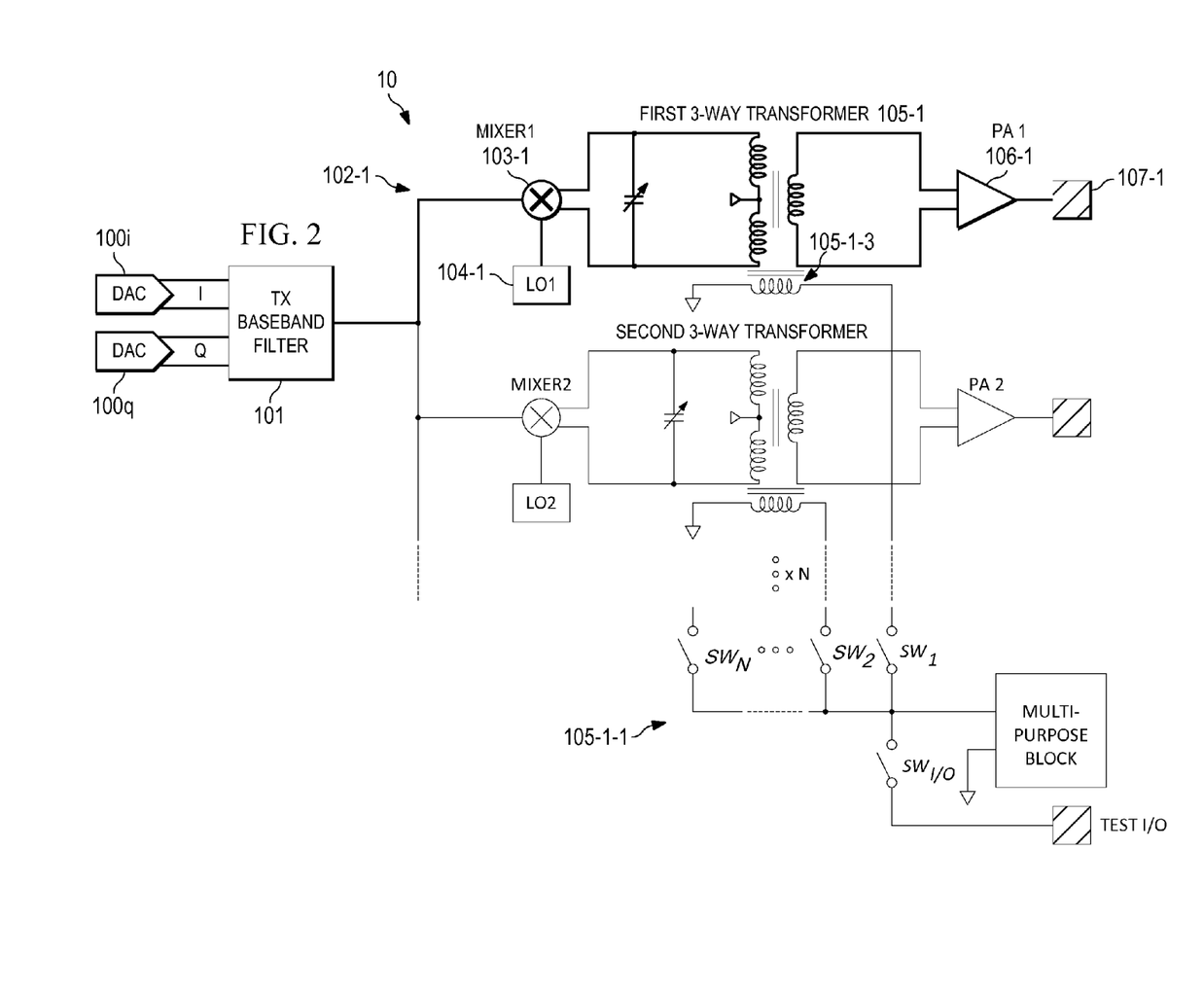
FIG. 2 is a circuit diagram conceptually illustrating wireless transmitter configured according to one aspect of the present disclosure.

FIG. 2 is a circuit diagram illustrating wireless transmitter 10 configured according to one aspect of the present disclosure. The example illustrated in FIG. 2 describes the operation through signal path 102-1. In the state illustrated in FIG. 2, switches $SW_1$, $SW_2$, to $SW_N$—109 are each open and the third winding 105-1-3 of the transformer 105-1 is deactivated. Thus, signals entering at DACs 100i and 100q are processed as normal through transmitter baseband filter 101, mixer 103-1 driven by LO 104-1, inductively coupled through transformer 105-1, and amplified through power amplifier 106-1 with the final processed signal provided at output pin 107-1. In this "normal" operating mode, wireless transmitter 10 provides and output signal at a particular frequency, as controlled by the configuration of mixer 103-1 and LO 104-1.

Figure 3:
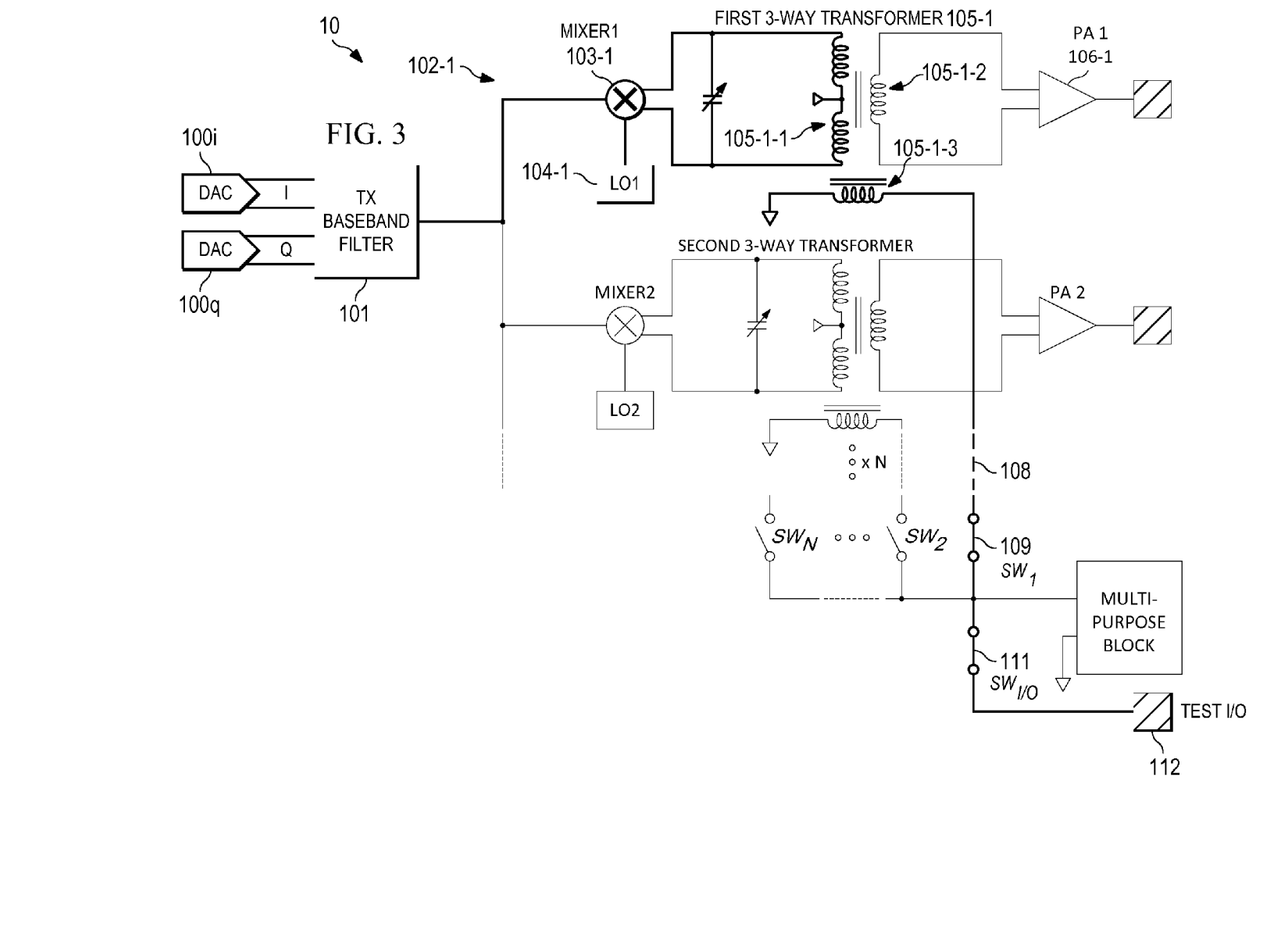
FIG. 3 is a circuit diagram conceptually illustrating wireless transmitter configured according to one aspect of the present disclosure.

FIG. 3 is a circuit diagram illustrating wireless transmitter 10 configured according to one aspect of the present disclosure. FIG. 3 illustrates wireless transmitter 10 in a testing mode for stand-alone testing the transmitter baseband filter 101 and mixer 103-1 of signal path 102-1. Testing equipment (not shown) is coupled to test I/O pin 112 with switches $SW_{I/O}$ 111 and $SW_1$ 109 closed, enabling shared access path 108 to access signal path 102-1 through the third winding 105-1-3 of transformer 105-1. The testing equipment provides disabling signals to power amplifier 106-1. Thus, the active portions of wireless transmitter 10 includes only DACs 100i and 100q, transmitter baseband filter 101, mixer 103-1, LO 104-1, first winding 105-1-1, and third winding 105-1-3. Second winding 105-1-2 is also deactivated. A test signal is applied at DACs 100i and 100q which is processed as usual through transmitter baseband filter 101 and mixer 103-1, driven by LO 104-1. The testing equipment attached at test I/O pin 112 receives the processed signal through the signal path access node of the tap in the third winding 105-1-3 of transformer 105-1 and shared access path 108. In this signal, the testing equipment may test for the filter performance of transmitter baseband filter 101, linearity of mixer 103-1, and the performance of LO 104-1.

Figure 4:
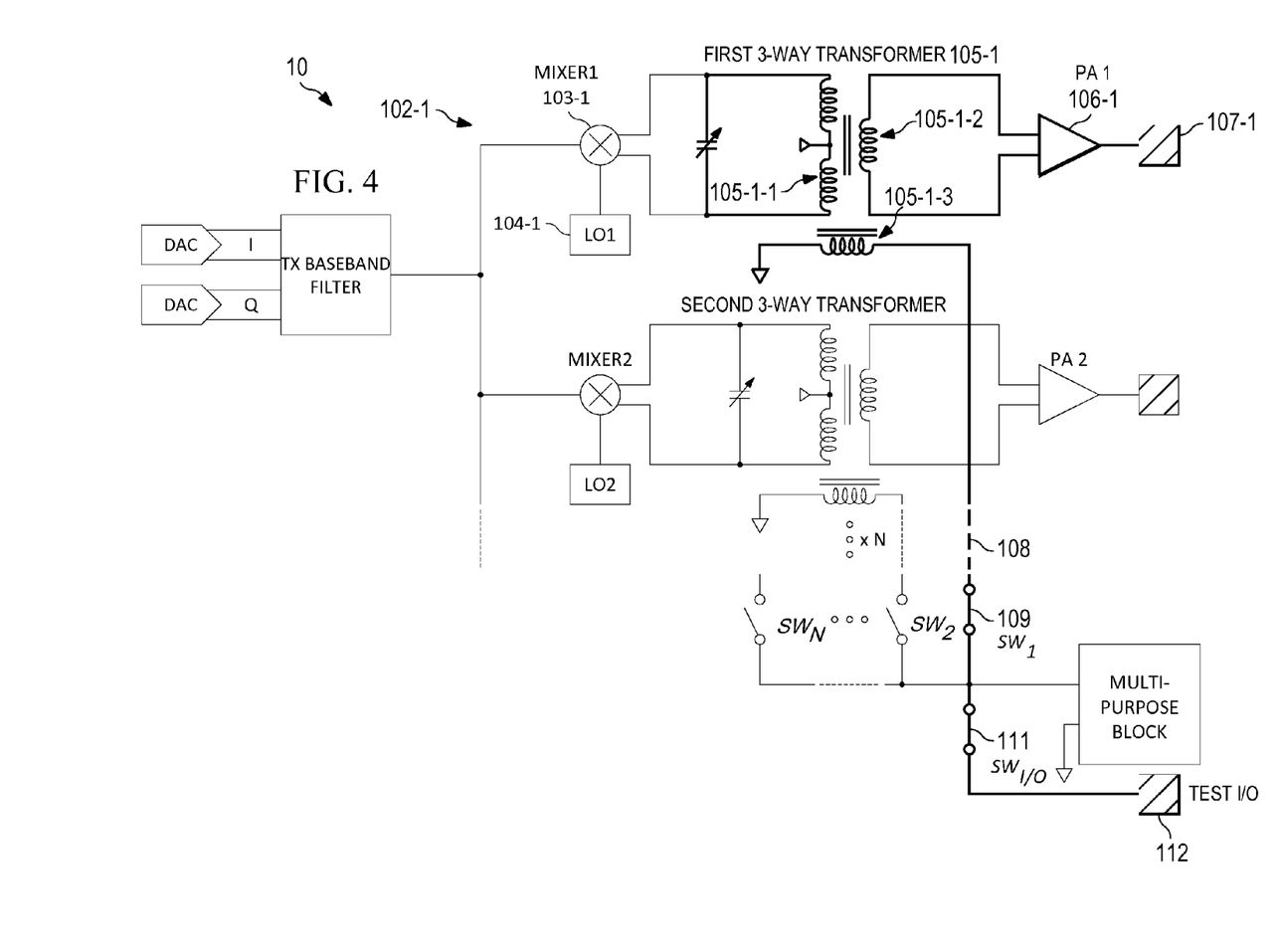
FIG. 4 is a circuit diagram conceptually illustrating wireless transmitter configured according to one aspect of the present disclosure.

FIG. 4 is a circuit diagram illustrating wireless transmitter 10 configured according to one aspect of the present disclosure. The example illustrated in FIG. 4 describes the operation through signal path 102-1 with each winding, first winding 105-1-1, second winding 105-1-2, and third winding 105-1-3, of first three-way transformer 105-1 activated. FIG. 4 illustrates wireless transmitter 10 in a testing mode for stand-alone testing of a power amplifier. Testing equipment (not shown) is coupled to test I/O pin 112 and switches $SW_{I/O}$ 111 and $SW_1$ 109 are closed, enabling shared access path 108 to access signal path 102-1 through the third winding 105-1-3 of transformer 105-1. The testing equipment transmits disabling signals over shared access path 108 to disable LO 104-1, which disables mixer 103-1 and the entire front end of wireless transmitter 10. The testing equipment injects a test signal at test I/O pin 112 over shared access path 108, which is applied as input to power amplifier 106-1 through the third winding 105-1-3 of transformer 105-1. Part of the testing equipment is then coupled to the output pin 107-1 to receive the output signal from power amplifier 106-1. Using this output signal, the testing equipment may characterize the power amplifier 106-1 and measure the linearity of the power amplifier 106-1, such as through digital pre-distortion (DPD) debugging. Accordingly, using the same shared access path 108 and combination of switches $SW_{I/O}$ 111 and $SW_1$ 109, the wireless transmitter 10 may perform stand-alone testing of different sections of one of the signal paths.

Figure 5:
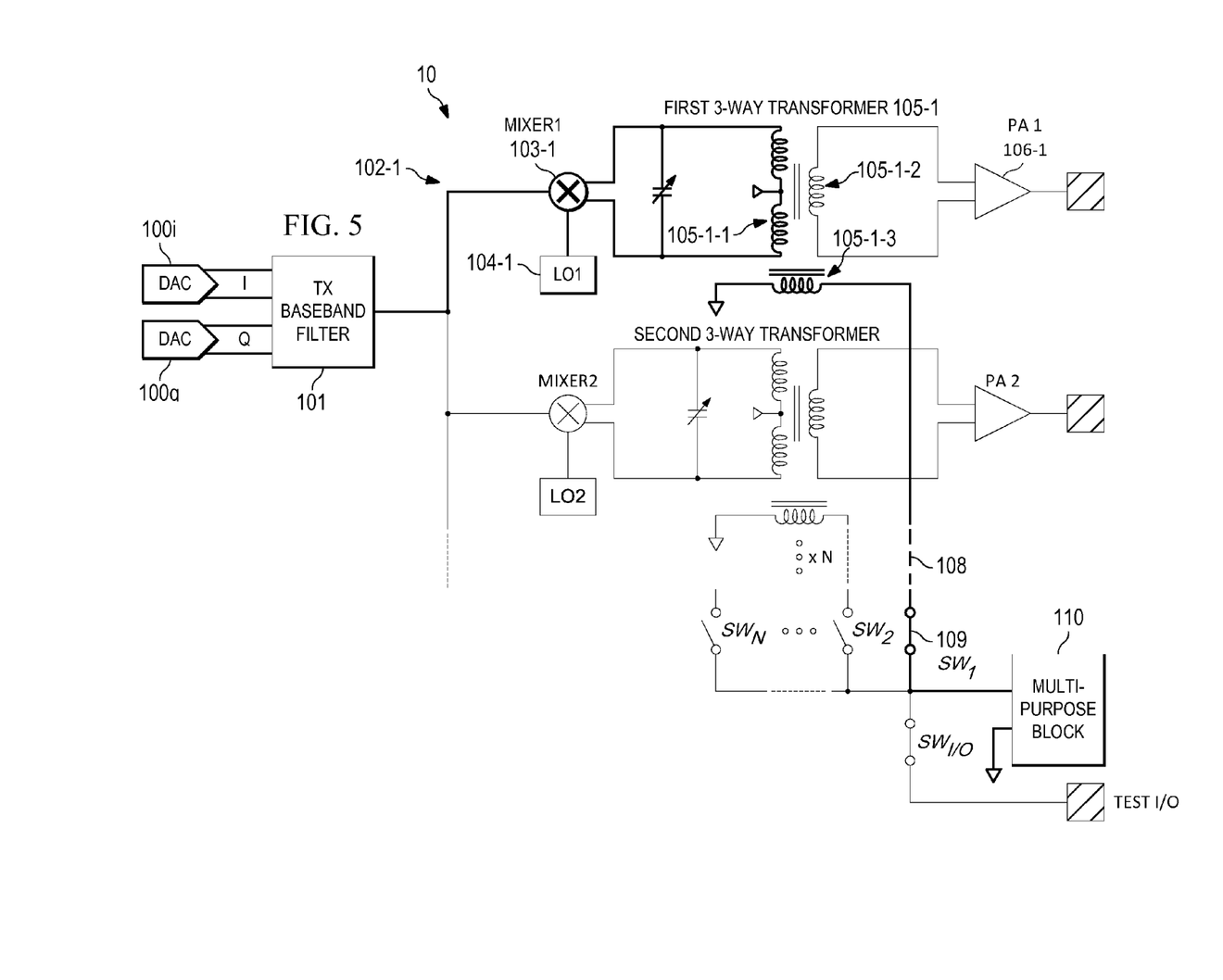
FIG. 5 is a circuit diagram conceptually illustrating wireless transmitter configured according to one aspect of the present disclosure.

FIG. 5 is a circuit diagram illustrating wireless transmitter 10 configured according to one aspect of the present disclosure. The example illustrated in FIG. 5 describes the operation through signal path 102-1 with the first winding 105-1-1 and third winding 105-1-3 activated, while the second winding 105-1-2 is inactive. FIG. 5 illustrates wireless transmitter 10 in a calibration mode for calibrating a portion of the front end of wireless transmitter 10, such as LO 104-1, any I/Q mismatch, and the like. A calibration unit, multi-purpose block 110, is coupled into signal path 102-1 with switch $SW_1$ 109 closed and the third winding 105-1-3 of transformer 105-1 being enabled. The multi-purpose block 110 transmits a disabling signal via shared access path 108 to disable power amplifier 106-1. This leaves the front end of wireless transmitter 10 active and available for testing and calibration. A test signal is applied to DACs 100i and 100q and processed through transmitter 101 and mixer 103-1 driving by LO 104-1. The resulting signal output from mixer 103-1 is received via shared access path 108 by multi-purpose block 110 through a tap in the third winding 105-1-3 of transformer 105-1. Multi-purpose block 110 may test the signal to determine if LO 104-1 is configured properly or whether there is any I/Q mismatch. Based on this testing, multi-purpose block 110 transmits calibration signals to the component being tested/calibrated in order to adjust the signal for proper or desired operation.

Figure 6:
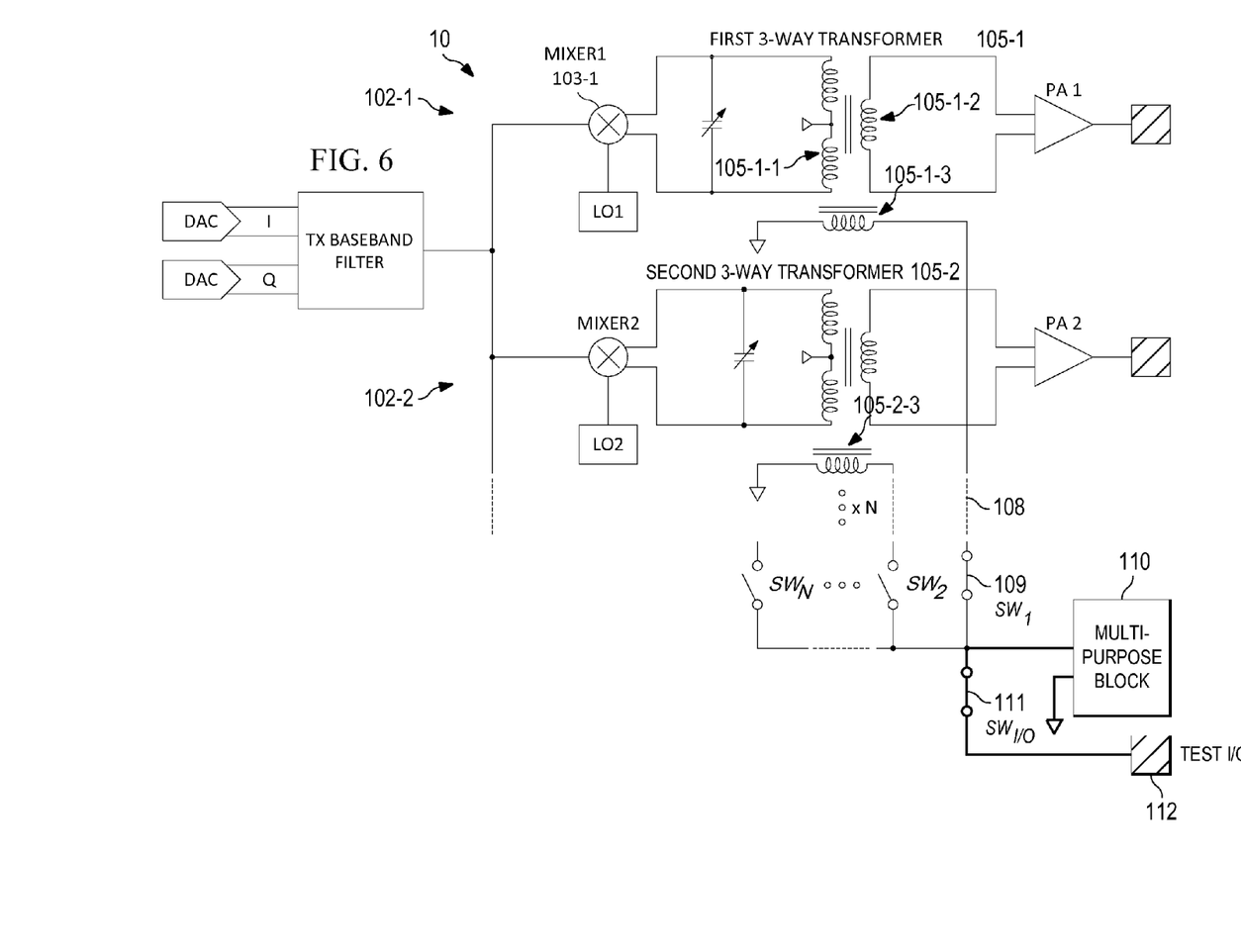
FIG. 6 is a circuit diagram conceptually illustrating wireless transmitter configured according to one aspect of the present disclosure.

FIG. 6 is a circuit diagram illustrating wireless transmitter 10 configured according to one aspect of the present disclosure. The example illustrated in FIG. 6 describes the operation through signal path 102-1 with each winding, first winding 105-1-1, second winding 105-1-2, and third winding 105-1-3, of first three-way transformer 105-1 inactive. FIG. 6 illustrates wireless transmitter 10 in a calibration mode for calibrating or self-testing multi-purpose block 110. Testing equipment (not shown) is coupled to text I/O pin 112 and transmits a signal that opens all of switches $SW_1$, $SW_2$, to $SW_N$—109. and closes switch $SW_{I/O}$ 111. With switches $SW_1$, $SW_2$, to $SW_N$—109 open and switch $SW_{I/O}$ 111 closed, the testing equipment couples to multi-purpose block 110 through the end portion of shared access path 108. As noted above, multi-purpose block 110 may comprise any number of different types of equipment or components, such as an LO calibration unit, an IQ calibration unit, a drive amplifier, and the like. The self-testing mode of operation allows this equipment, the multi-purpose block 110 to be tested and calibrated itself.

It should be noted that each signal path of the wireless transmitter 10, such as signal path 102-1 and 102-2, may operate in different modes individually using the same shared access path 108, as controlled by appropriate activation of switches $SW_1$, $SW_2$, to $SW_N$—109 and switch $SW_{I/O}$ 111. This configuration allows for a flexible number of testing and calibration modes using shared pathways, thus, conserving chip die area. Moreover, use of the three-way transformer, such as transformers 105-1 and 105-2, can reduce both the loading effects and asymmetries on the mixers and power amplifiers. The use of a three-way transformer, such as transformers 105-1 and 105-2, also provides for direct current (DC) isolation, thus, the transmitter would not require alternating current (AC) coupling (or DC blocking) capacitors at the signal coupling through the third winding 105-1-3 and 105-2-3.

The various aspects of the present disclosure allow for each mixer and power amplifier to be tested separately through on test pin, such as test I/O pin 112. The mixer or power amplifier may also have standalone measurement support, which makes processes, such as power amplifier DPD debugging much easier. Furthermore, common transmit blocks, such as the LO or IQ calibration blocks, pre-drivers for external devices, and test I/O ports may also be shared over shared test paths, such as shared access paths 108. The transmit filter, such as transmit baseband filter 101, may be shared when only one of the signal paths operates at a time in a normal operational mode.

Figure 7:
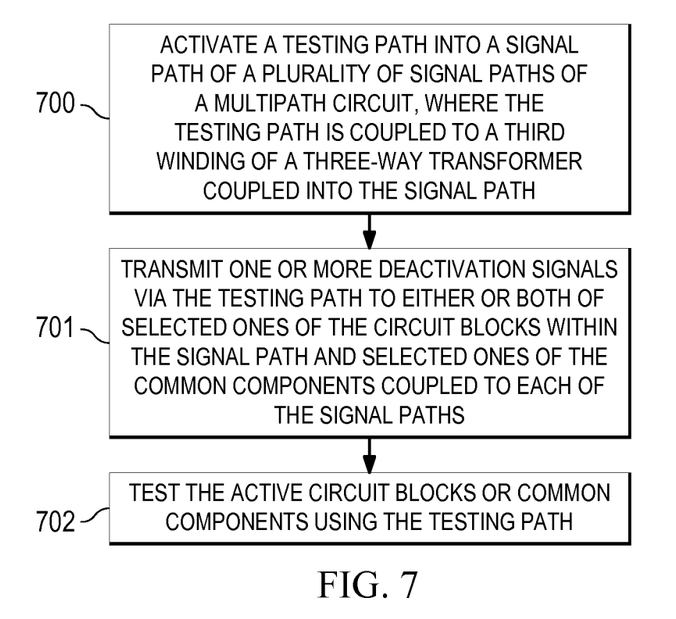
FIG. 7 is a functional block diagram illustrating example blocks executed to implement one aspect of the present disclosure.

FIG. 7 is a functional block diagram illustrating example blocks executed to implement one aspect of the present disclosure. In block 700, a testing path is activated into a signal path of a plurality of signal paths of a multipath circuit, where the testing path is coupled to a third winding of a three-way transformer coupled into the signal path. The multipath circuit may be a wireless transmitter or wireless receiver. One or more deactivation signals are transmitted via the testing path, in block 701, to either or both of selected ones of the circuit blocks within the signal path and selected ones of the common components coupled to each of the signal paths. The active circuit blocks or common components are then tested, in block 702, using the testing path.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless radio transmitter configured for wireless communication, comprising:
   a plurality of signal paths, each of the plurality of signal paths including a plurality of circuit blocks;
   one or more common components coupled to each of the plurality of signal paths;
   a three-way transformer in each of the plurality of signal paths, wherein a first winding of the three-way transformer is coupled to a first group of circuit blocks of the plurality of circuit blocks, a second winding of the three-way transformer is coupled to a second group of circuit blocks of the plurality of circuit blocks, and a third winding of the three-way transformer is coupled to the one or more common components;
   one or more switches coupled to the third winding of the three-way transformer of each of the plurality of signal paths, wherein, in response to activation of the one or more switches, a shared access path is created between the one or more common components and at least one of the first and second groups of circuit blocks.

2. The wireless radio transmitter of claim 1, further comprising:
   adding an input signal from the one or more common components into one or more of the plurality of signal paths through the shared access path.

3. The wireless radio transmitter of claim 2, wherein the input signal is added to at least one of the first and second groups of circuit blocks.

4. The wireless radio transmitter of claim 1, further comprising:
   measuring, by the one or more common components, a transmitter signal from one or more of the plurality of signal paths through the shared access path.

5. The wireless radio transmitter of claim 4, wherein the transmitter signal is measured from at least one of the first and second groups of circuit blocks.

6. The wireless radio transmitter of claim 1, wherein the one or more common components comprises one or more of:
   a test pin;
   a calibration module;
   a drive amplifier; and
   a signal generator.

7. The wireless radio transmitter of claim 1, wherein the plurality of circuit blocks comprises one or more of:
   a baseband filter;
   a local oscillator;
   a mixer; and
   a power amplifier.

8. A method for testing a multipath circuit, comprising:
   activating a testing path into a signal path of a plurality of signal paths of the multipath circuit, the testing path coupled to a third winding of a three-way transformer coupled into the signal path;
   transmitting one or more deactivation signals via the testing path to at least one of: one or more circuit blocks of a plurality of circuit blocks within the signal path and one or more common components of a plurality of common components coupled to each of the plurality of signal paths; and
   testing active ones of each of the plurality of circuit blocks and the plurality of common components using the testing path.

9. The method of claim 8, further comprising:
   injecting a test signal into the signal path from the testing path, wherein the test signal enters the signal path through the third winding of the three-way transformer;
   processing the test signal by the active ones of each of the plurality of circuit blocks and the plurality of common components; and
   measuring the processed test signal.

10. The method of claim 8, further comprising:
    injecting a test signal at an input to at least one of the active ones of each of the plurality of circuit blocks and the plurality of common components;
    processing the test signal by the active ones of each of the plurality of circuit blocks and the plurality of common components; and
    measuring the processed test signal through the testing path, wherein the processed test signal enters the testing path through the third winding of the three-way transformer.

11. The method of claim 8, wherein the plurality of common components comprises two or more of:
    a test pin;
    a calibration module;
    a drive amplifier; and
    a signal generator.

12. The method of claim 8, wherein the plurality of circuit blocks comprises one or more of:
    a baseband filter;
    a local oscillator;
    a mixer; and
    a power amplifier.

13. The method of claim 8, wherein the multipath circuit comprises one of: a wireless transmitter or a wireless receiver.

14. The method of claim 8, further comprising:
    activating a second testing path into a second signal path of the plurality of signal paths of the multipath circuit, the second testing path coupled to an additional third winding of an additional three-way transformer coupled into the second signal path;

transmitting one or more second deactivation signals via the second testing path to at least one of: one or more second circuit blocks of a second plurality of circuit blocks within the second signal path and one or more second common components of a second plurality of common components coupled to each of the plurality of signal paths; and testing second active ones of each of the second plurality of circuit blocks and the second plurality of common components using the second testing path.

15. A multipath wireless circuit, comprising:

means for activating a testing path into a signal path of a plurality of signal paths of the multipath circuit, the testing path coupled to a third winding of a three-way transformer coupled into the signal path;

means for transmitting one or more deactivation signals via the testing path to at least one of: one or more circuit blocks of a plurality of circuit blocks within the signal path and one or more common components of a plurality of common components coupled to each of the plurality of signal paths; and means for testing active ones of each of the plurality of circuit blocks and the plurality of common components using the testing path.

16. The multipath wireless circuit of claim 15, further comprising:

means for injecting a test signal into the signal path from the testing path, wherein the test signal enters the signal path through the third winding of the three-way transformer;

means for processing the test signal by the active ones of each of the plurality of circuit blocks and the plurality of common components; and means for measuring the processed test signal from an output of one of the active ones of each of the plurality of circuit blocks and the plurality of common components.

17. The multipath wireless circuit of claim 15, further comprising:

means for injecting a test signal at an input to at least one of the active ones of each of the plurality of circuit blocks and the plurality of common components;

means for processing the test signal by the active ones of each of the plurality of circuit blocks and the plurality of common components; and means for measuring the processed test signal through the testing path, wherein the processed test signal enters the testing path through the third winding of the three-way transformer.

18. The multipath wireless circuit of claim 15, wherein the plurality of common components comprises two or more of:
a test pin;
a calibration module;
a drive amplifier; and
a signal generator.

19. The multipath wireless circuit of claim 15, wherein the plurality of circuit blocks comprises one or more of:
a baseband filter;
a local oscillator;
a mixer; and
a power amplifier.

20. The multipath wireless circuit of claim 15, wherein the multipath circuit comprises one of: a wireless transmitter or a wireless receiver.

21. The multipath wireless circuit of claim 15, further comprising:

means for activating a second testing path into a second signal path of the plurality of signal paths of the multipath circuit, the second testing path coupled to an additional third winding of an additional three-way transformer coupled into the second signal path;

means for transmitting one or more second deactivation signals via the second testing path to at least one of: one or more second circuit blocks of a second plurality of circuit blocks within the second signal path and one or more second common components of a second plurality of common components coupled to each of the plurality of signal paths; and means for testing second active ones of each of the second plurality of circuit blocks and the second plurality of common components using the second testing path.

* * * * *